(12) United States Patent
Singh et al.

(10) Patent No.: US 9,992,639 B1
(45) Date of Patent: Jun. 5, 2018

(54) SEMANTICALLY-ENABLED CONTROLLED SHARING OF OBJECTS IN A DISTRIBUTED MESSAGING PLATFORM

(71) Applicants: Avni P Singh, Austin, TX (US); Arati P Singh, Austin, TX (US)

(72) Inventors: Avni P Singh, Austin, TX (US); Arati P Singh, Austin, TX (US)

( * ) Notice: Subject to any disclaimer, the term of this patent is extended or adjusted under 35 U.S.C. 154(b) by 0 days. days.

(21) Appl. No.: 15/663,799

(22) Filed: Jul. 30, 2017

Related U.S. Application Data

(60) Provisional application No. 62/424,410, filed on Nov. 19, 2016.

(51) Int. Cl.
  *H04W 4/12* (2009.01)
  *H04L 12/58* (2006.01)

(52) U.S. Cl.
  CPC ............ *H04W 4/12* (2013.01); *H04L 51/08* (2013.01); *H04L 51/22* (2013.01)

(58) Field of Classification Search
  CPC ..... H04L 63/0428; H04L 63/12; H04L 67/32; G06F 15/16; G06F 17/30648; G06F 17/30867
  USPC .......................... 709/206, 223, 227; 370/260
  See application file for complete search history.

(56) References Cited

U.S. PATENT DOCUMENTS

| | | | | |
|---|---|---|---|---|
| 6,665,722 | B1 * | 12/2003 | Elliott | H04L 65/604 370/389 |
| 6,977,909 | B2 * | 12/2005 | Minborg | H04L 29/06 370/260 |
| 7,483,694 | B2 * | 1/2009 | Varanda | H04M 1/24 379/1.01 |
| 8,909,725 | B1 | 12/2014 | Sehn | |
| 9,026,943 | B1 | 5/2015 | Spiegel | |
| 9,294,425 | B1 | 3/2016 | Son | |
| 9,396,354 | B1 | 7/2016 | Murphy et al. | |
| 9,639,907 | B2 * | 5/2017 | Theobald | G06Q 50/12 |
| 2007/0118634 | A1 * | 5/2007 | Chan | G06F 8/24 709/223 |
| 2007/0168428 | A1 * | 7/2007 | Clift | H04M 3/38 709/206 |
| 2008/0159627 | A1 | 7/2008 | Sengamedu | |

(Continued)

OTHER PUBLICATIONS

"Monitor Snapchat on Mobile Devices", downloaded from http://pumpic.com/monitorsnapchat.html, Oct. 16, 2016, 7 pages.

(Continued)

*Primary Examiner* — Tesfay Yohannes

(57) ABSTRACT

A method including receiving a request for a visual object pertaining to a body portion of a first user from a second user is provided. The method includes sending a request to a messaging platform for a history of prior requests by the second user for any visual objects pertaining to at least one body portion of a body of another user. The method further includes displaying to the first user a modified history of any prior requests for visual objects by the second user that were flagged by any of the group of users as belonging to a community-specific category of requests for visual objects pertaining to body portions of respective bodies of other users. The method further includes sending a selected message from a set of pre-configured messages to the messaging platform for transmission of the selected message to the second user.

17 Claims, 8 Drawing Sheets

(56) References Cited

U.S. PATENT DOCUMENTS

| | | | | |
|---|---|---|---|---|
| 2009/0041206 | A1* | 2/2009 | Hobby | H04W 4/90 |
| | | | | 379/45 |
| 2011/0119079 | A1* | 5/2011 | Schoenberg | G06F 19/328 |
| | | | | 705/2 |
| 2013/0200725 | A1* | 8/2013 | Apelker | G05B 15/02 |
| | | | | 307/117 |
| 2015/0128063 | A1 | 5/2015 | Jones | |
| 2016/0210611 | A1* | 7/2016 | Wilkes | G06Q 20/28 |
| 2016/0259497 | A1* | 9/2016 | Foss | G06F 3/0482 |

OTHER PUBLICATIONS

"Privacy Policy—Snapchat", downloaded from https://www.snapchat.com/privacy, Sep. 27, 2016, 9 pages.

Assal et al., "Semantically-Enhanced Information Extraction", Published in Aerospace Conference, IEEE, Mar. 5-12, 2011, 13 pages.

"Snapchat images that have 'disappeared forever' stay right on your phone . . . ", downloaded from https://nakedsecurity.sophos.com/2013/05/10/snapchatimagesthathavedisappearedforeverstayrightonyourphone/, May 10, 2013, 16 pages.

"Snapchat tracking & monitoring app! Monitor photo, video, contacts, massages with mSpy Software!", downloaded from https://www.mspy.com/snapchat.html Oct. 16, 2016, 3 pages.

\* cited by examiner

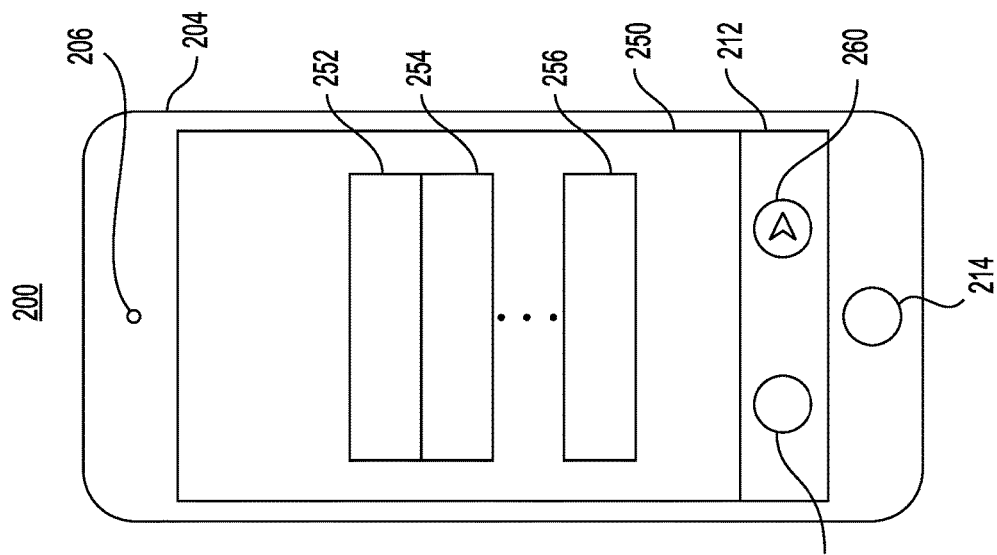
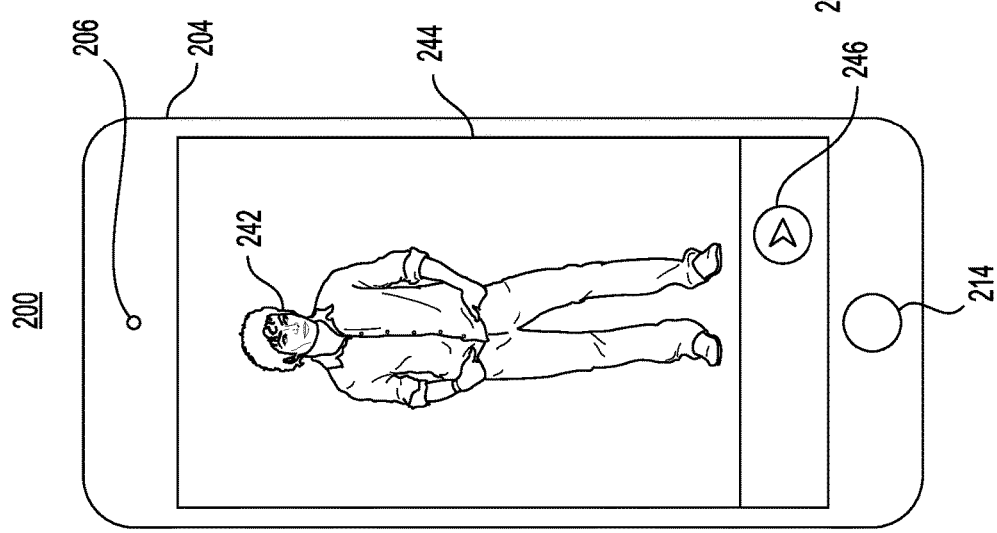
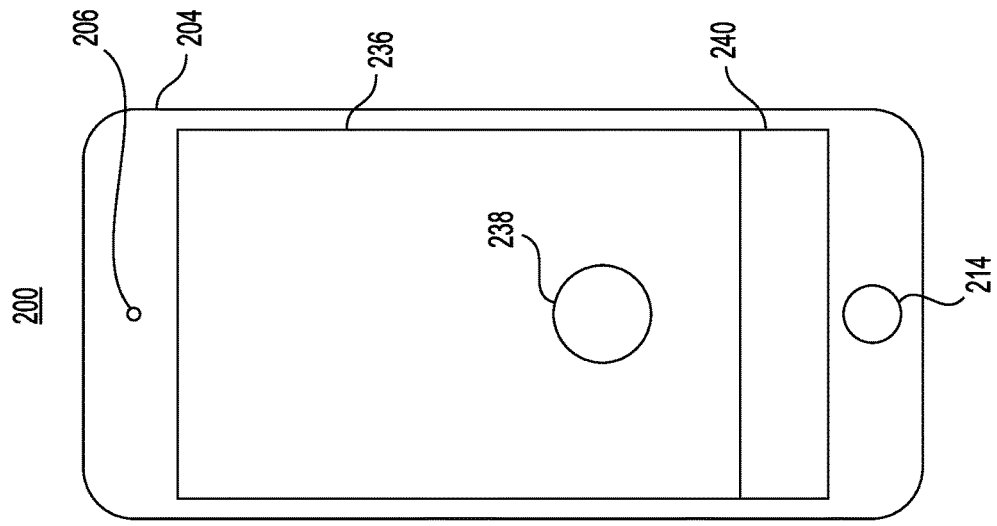

SEMANTICALLY-ENABLED CONTROLLED SHARING OF OBJECTS IN A DISTRIBUTED MESSAGING PLATFORM

CROSS-REFERENCE TO A RELATED APPLICATION

This application claims priority to U.S. Provisional Application No. 62/424,410, filed Nov. 19, 2016, titled "SEMANTICALLY-ENABLED CONTROLLED SHARING OF OBJECTS IN A DISTRIBUTED MESSAGING PLATFORM," the entire contents of which are hereby incorporated herein by reference.

BACKGROUND

1. Field

This disclosure generally relates to systems, devices, and methods for a semantically-enabled controlled sharing of objects in a distributed messaging platform.

2. Related Art

Traditional messaging applications and platforms for communicating texts, photos, or videos of are limited in terms of the visibility and control over the distribution of such objects. Many such systems provide a user of the messaging application little guidance on the environment, the context, and other information that may be necessary to make logical decisions.

Current solutions to these problems are not sufficient and accordingly there is a need for improved systems, devices, and methods.

SUMMARY

In one example, the present disclosure relates to a method in a device including a first messaging application configured to communicate with a messaging platform: (1) configured to receive requests for visual objects from the messaging application and (2) configured to serve requested visual objects to the messaging application. The method may include receiving by the first messaging application a request for a visual object pertaining to at least one body portion of a body of the first user from a second user of a second messaging application. The method may further include in response to the request from the second user of the second messaging application, via the first messaging application, sending a request to the messaging platform for a history of prior requests by the second user for any visual objects pertaining to at least one body portion of a body of another user. The method may further include displaying to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users. The method may further include upon the viewing of the modified history of any prior requests by the first user, in response to a first input from the first user, instead of transmitting a visual object pertaining to the at least one body portion of the body of the first user for viewing by the second user, sending a selected message from a set of pre-configured messages, via the first messaging application, to the messaging platform for transmission of the selected message to the second user.

In another example, the present disclosure relates to a computer-readable medium comprising instructions corresponding to a method in a device including instructions corresponding to a first messaging application configured to communicate with a messaging platform: (1) configured to receive requests for visual objects from the messaging application and (2) configured to serve requested visual objects to the messaging application. The method may include receiving by the first messaging application a request for a visual object pertaining to at least one body portion of a body of the first user from a second user of a second messaging application. The method may further include in response to the request from the second user of the second messaging application, via the first messaging application, sending a request to the messaging platform for a history of prior requests by the second user for any visual objects pertaining to at least one body portion of a body of another user. The method may further include displaying to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users. The method may further include upon the viewing of the modified history of any prior requests by the first user, in response to a first input from the first user, instead of transmitting a visual object pertaining to the at least one body portion of the body of the first user for viewing by the second user, sending a selected message from a set of pre-configured messages, via the first messaging application, to the messaging platform for transmission of the selected message to the second user.

In yet another example, the present disclosure relates to a distribute computing system or enabling a first device having a first messaging application configured to communicate with a messaging platform: (1) configured to receive requests for visual objects from messaging applications and (2) configured to serve requested visual objects to the messaging applications. The distributed computing system may include a first component configured to receive a request from a second messaging application for a visual object relating to a first user of the first messaging application from a second user of a second messaging application. The distributed computing system may further include a second component configured to, in response to the request from the second user of the second messaging application, via the first messaging application, send a request to the messaging platform for a history of prior requests by the second user for any visual objects pertaining to at least one body portion of a body of another user. The distributed computing system may further include a third component configured to display to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users. The distributed computing system may further include a fourth component configured to, upon the viewing of the modified history of any prior requests by the first user, in response to a first input by the first user, sending a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of examples and is not limited by the accompanying figures, in which like references indicate similar elements. Elements in the figures are illustrated for simplicity and clarity and have not necessarily been drawn to scale.

FIGS. 2A-2G illustrate user interface elements and interaction between a user of a semantically-enabled controlled sharing of objects in a distributed messaging platform in accordance with one example;

DETAILED DESCRIPTION

Figure 1:
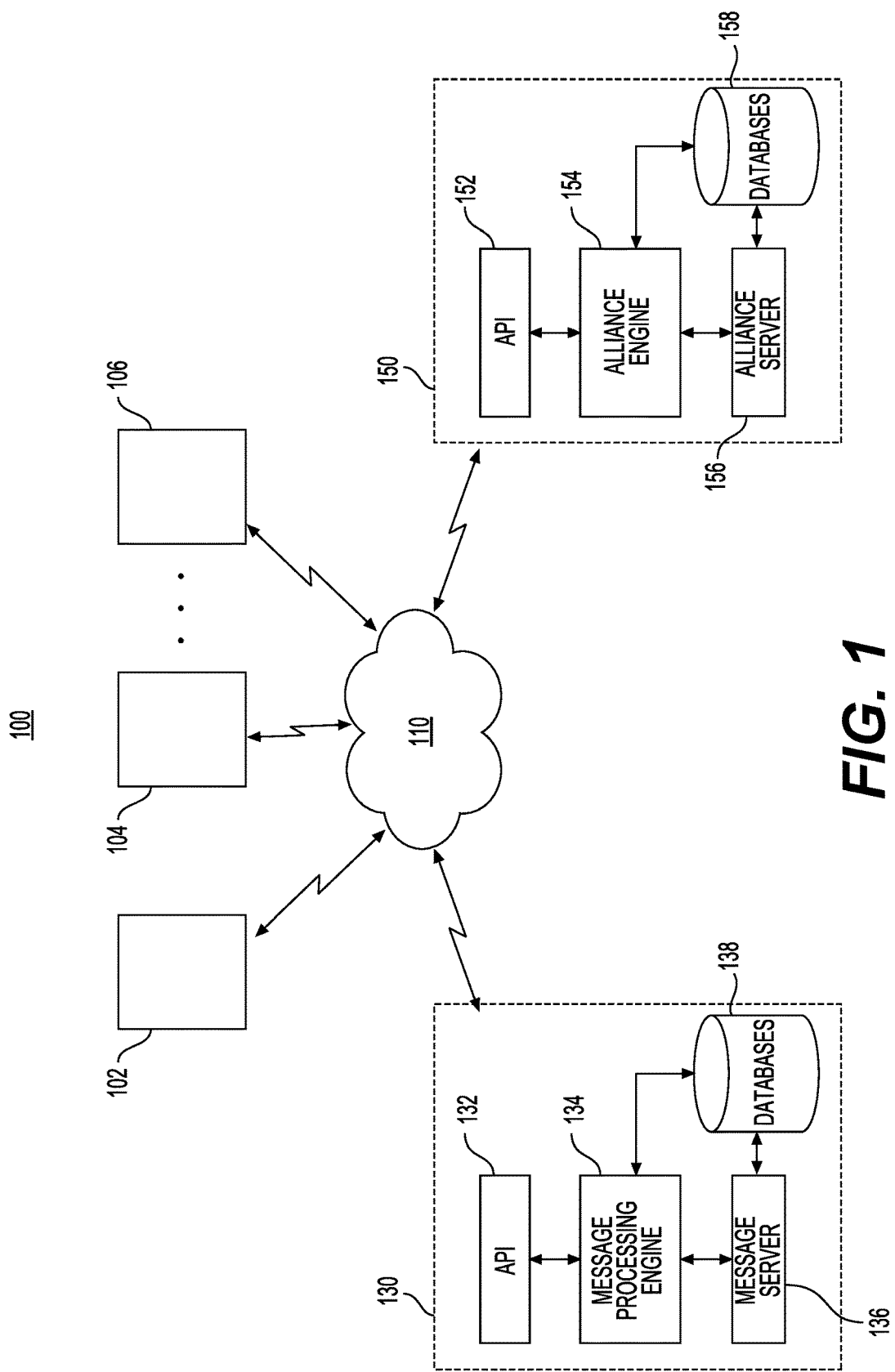
FIG. 1 is a block diagram of a system environment for a semantically-enabled controlled sharing of objects in a distributed messaging platform in accordance with one example.
Figure 2B:
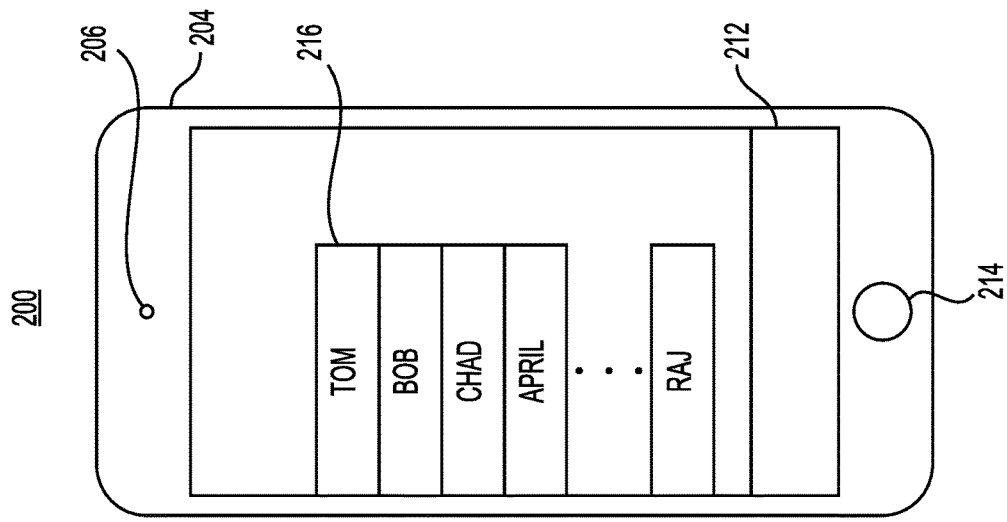
Figure 2A:
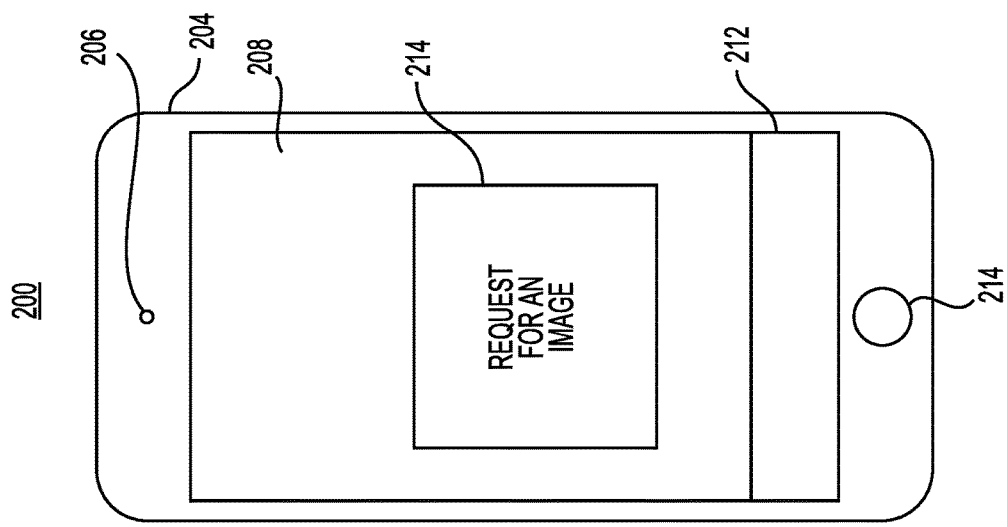
Figure 2D:
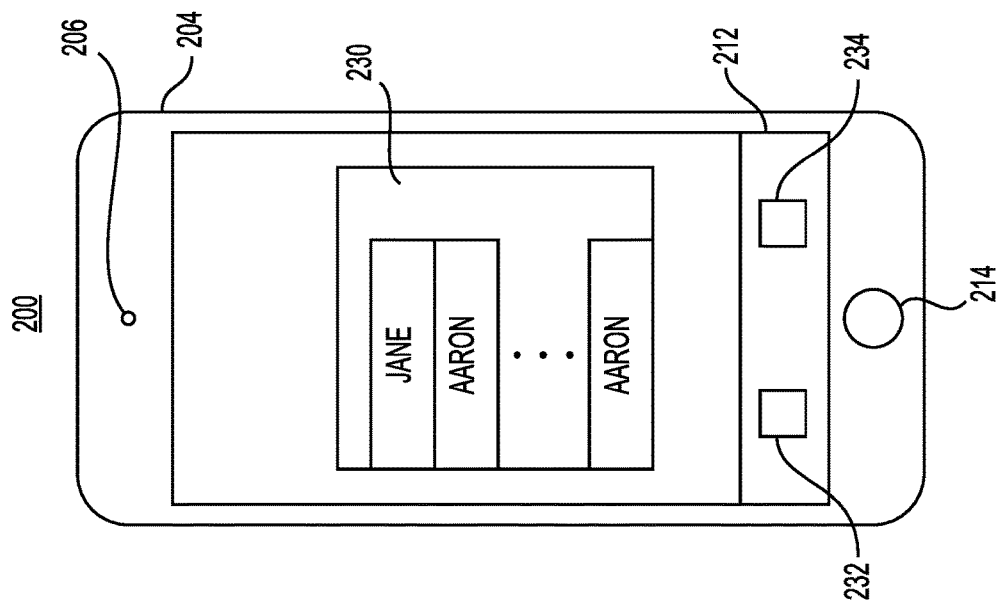
Figure 2C:
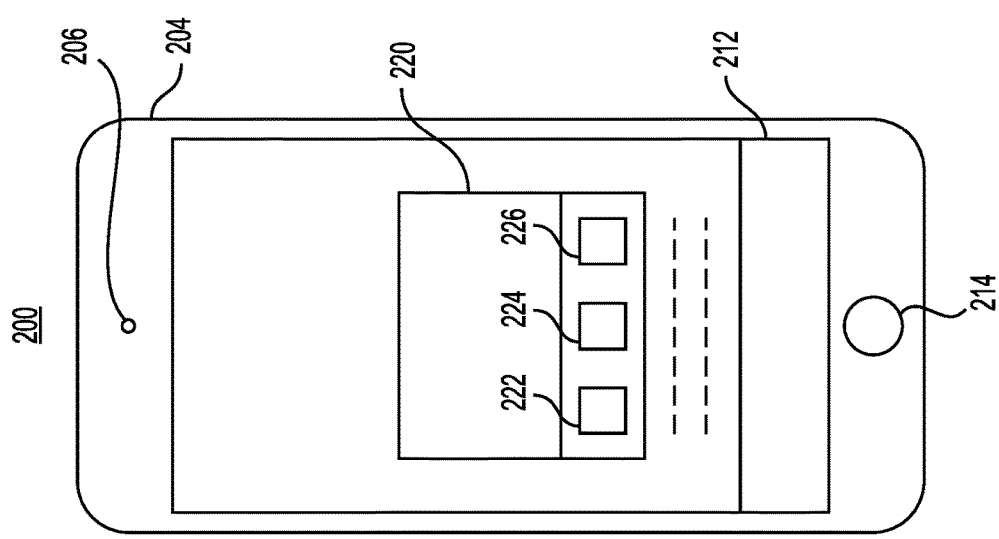

Traditional messaging applications and platforms for communicating texts, photos, or videos of are limited in terms of the visibility and control over the distribution of such objects. Many such systems provide a user of the messaging platform no guidance on the environment, the context, and other information that may be necessary to make more logical decisions. A lack of models and related control information prevents users of such systems to respond effectively to messaging requests and other actions.

As an example, using messaging platforms, such as Snapchat, it is common for a teen boy to be requesting and receiving "nudes" from multiple girls at a time. And often, it is the girl who is blamed for "destroying their dignity" by sending naked pictures of herself instead of the boy who requested them. In certain high schools in certain countries, these practices have become so widespread, that girls may not think twice about sending "nudes." As part of the dating process, being friends, the teens usually start with messaging via messaging applications, such as Snapchat. Every day, a girl may update her girl-friends on how her "relationship" was going (before it even really began). However, one day the boy may ask the dreaded question over Snapchat: send nudes? The girl may not want this boy to think she was a prude and lose her only chance at possibly becoming more than friends, but she also may not want to send the pictures because she may believe that such an act may create latent dangers for her. She may not know what to say.

Another situation may involve a girl liking a guy at her school, and he may also like her, but she might not shake the doubt that every night he was asking for other girls' nudes. How could she trust him? In today's world, there is now this third category in between "single" and "taken"—snapchatting other girls for their naked pictures. There is no current solution for these girls. The problem is that these girls cannot trust the boys they are talking to, both out of fear of giving in and losing their dignity, and fear of being just one of many other girls pining for his attention.

Certain examples of the present disclosure not only solve these problems by offering a full history displaying any boy's past requests for nudes, but also empower girls to expose boys, who exploit the simple messaging platforms in their community, and share witty responses to the requests. Certain examples relate to a distributed computing system for enabling a first device having a first messaging application configured to communicate with a messaging platform including a messaging server: (1) configured to receive requests for visual objects from messaging applications and (2) configured to serve requested visual objects to the messaging applications. The system may include: a first component configured to receive a request from a second messaging application for a visual object relating to a first user of the first messaging application from a second user of a second messaging application. The system may further include a second component configured to, in response to the request from the second user of the second messaging application, via the first messaging application, send a request to the messaging platform for a history of prior requests by the second user for any visual objects pertaining to at least one body portion of a body of another user. The system may further include a third component configured to display to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users. The system may further include a fourth component configured to, upon the viewing of the modified history of any prior requests by the first user, in response to a first input by the first user, send a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

FIG. 1 is a block diagram of a system environment for a semantically-enabled controlled sharing of objects in a distributed messaging platform in accordance with one example. Mobile devices 102, 104, and 106 may communicate via wireless (or wired) networks 110 with a messaging platform 120 and a control platform 150. Wireless networks 110 may include cellular networks, Wi-Fi networks, Personal Area Networks, such as Bluetooth, or other types of wireless networks. Wireless networks 110 may include not only communication apparatus, such as cell sites, but also cloud computing infrastructure. The cloud computing infrastructure may be used to provide additional computing and storage functionality to mobile devices. Mobile devices may also communicate with other networks that may be included as part of wireless network 110, such as sensor networks. Sensor networks may allow mobile devices to engage in machine-to-machine communication. While FIG. 1 shows a network 110, the functionality related to these networks may be distributed into different types of networks. Via wireless networks 110, and as needed, via sensor networks, mobile devices may also communicate with additional smart devices either worn by a user of a device or carried by the user of another device. As an example, the user may have smart glasses, a wearable electronics device, or smart footwear on their person. Each of these devices may communicate via wireless networks 110. Each of these devices may have the same or similar functionality and modules as described for the messaging device later. Thus, for example, wearable electronics device may be part of the clothing worn by the user and that might be the only device on the user's person and still provide all or most of the functions related to a messaging device. In one embodiment, smart footwear may have several sensors, controllers, and memory embedded in them. As an example, these components may be part of an integrated circuit coupled to antenna. These components may be housed in the sole of the footwear. A battery may also be included in the sole to power these components. Additional details regarding smart footwear with sensors are described in U.S. Pat. No. 8,676,541, which is incorporated by reference herein in its entirety. As an example, FIG. 6 of the '541 patent and related description describe similar components embedded in the sole of footwear. The memory component of smart footwear may include instructions, which when executed by a processor, may provide functionality associated with smart footwear. Smart glasses may have several sensors, controllers, and memory embedded in them. As an example, these components may be part of an integrated circuit coupled to antenna. These components may be housed in the frame of the glasses or a housing attached to the frames. A battery may also be included in the housing to power these components. Additional details of smart glasses are described in U.S. Patent Application Publication No. 2014/0218269, which is based on application Ser. No. 13/762,146, filed on Feb. 7, 2013, which is incorporated by reference herein in its entirety. In particular, FIG. 7 of the '146 application and related description describe a head mounted device, which could form the basis of smart glasses. Not all aspects depicted in FIG. 1 are needed for each method; instead some or all of the aspects may be used.

Wireless networks 110 may include cellular networks, Wi-Fi networks, Personal Area Networks, such as Bluetooth, or other types of wireless networks. In addition to such networks, NFC, ultra-wide band (UWB) or like technologies may also be used to provide the communication between mobile devices, the messaging platform, and the control platform. In addition, a messaging device may be docked or connected to an automotive via a docking connector or other type of electrical connector. A messaging device and an automotive may also communicate with each other or other sensors via sensor networks.

FIGS. 2A-2G illustrate user interface elements and interaction between a user of a semantically-enabled controlled sharing of objects in a distributed messaging platform in accordance with one example. In one embodiment, the message may be a pre-configured message that may be transmitted via Short Message Service (SMS), Multimedia Messaging Service (MMS), or similar services. In an alternative embodiment, prior to transmission, the pre-configured message may be automatically modified to include additional information based on sensor measurements. As an example, MD 400 may determine its location by interacting with a location server in wireless networks 110. The first messaging application may provide a search box allowing the first user to search for any users whose at least one request for a visual object pertaining to a body portion of a body of another user has been flagged as part of the community-specific category of requests for visual objects pertaining to body portions of other users.

Figure 3:
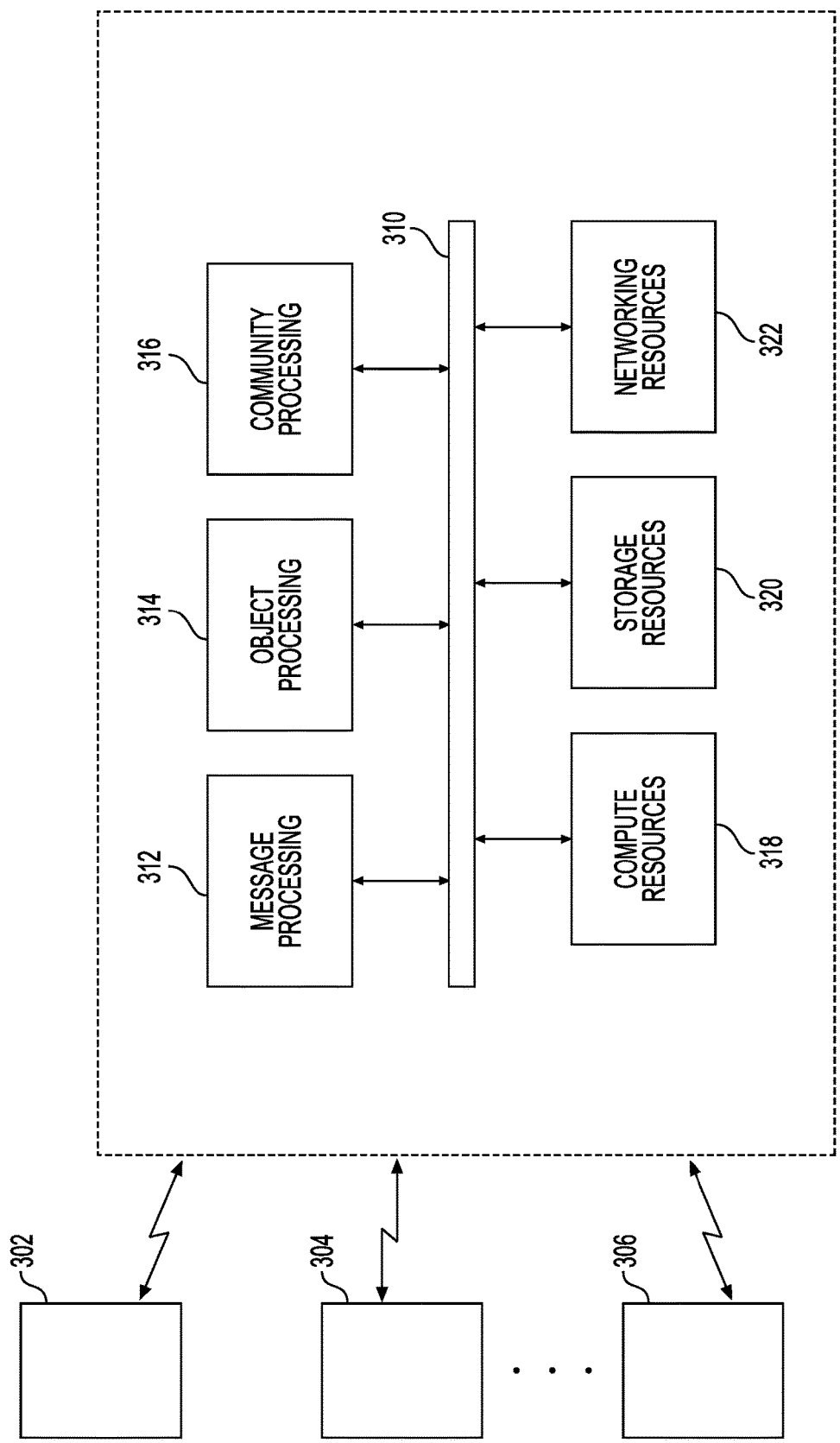
FIG. 3 is a block diagram of a semantically-enabled controlled sharing of objects in a distributed messaging platform.

FIG. 3 is a block diagram of a system 300 semantically-enabled controlled sharing of objects in a distributed messaging platform. System 300 may interact with messaging devices 302, 304, and 306 via wireless or wired signals. System 300 may include at least components related to message processing 312, object processing 314, and community processing coupled via a bus 310. System 300 may also include compute resources 318, storage resources 320, and networking resources 322. These resources may be distributed or aggregated in different ways. The functionality associated with the processing components may also be distributed or aggregated. Each one of these components may provide at least some of the functionality discussed with respect to the flow chart shown in FIG. 6.

Figure 4:
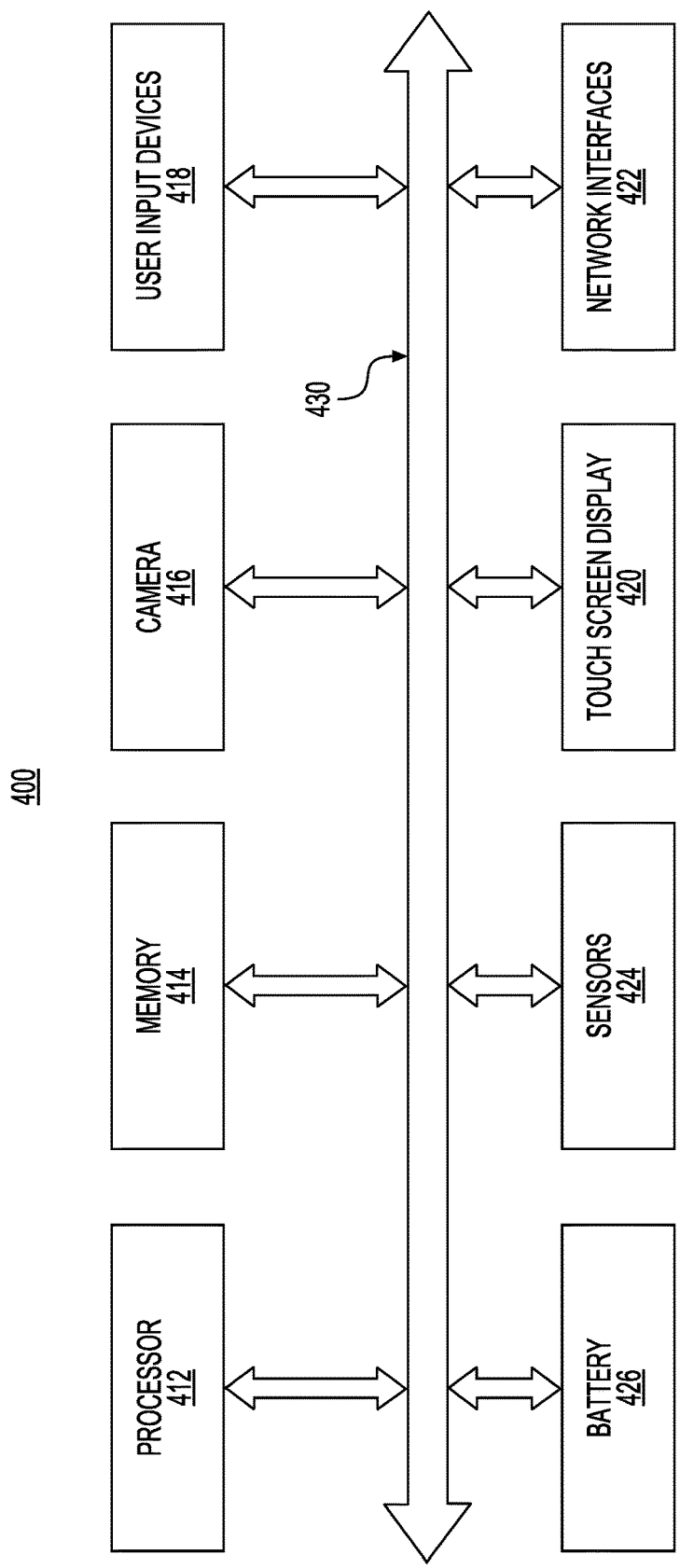
FIG. 4 is a block diagram of a messaging device for use with a semantically-enabled controlled sharing of objects in a distributed messaging platform.

FIG. 4 is a block diagram of a messaging device (MD) 400 for use with a semantically-enabled controlled sharing of objects in a distributed messaging platform. Without limitations, such a messaging device may be any device that can be carried by a person, such as a handheld device or a wearable device. In one embodiment, MD 400 may include a processor 412, memory 414, camera 416, and user input devices 418, touch screen display 420, network interfaces 422, sensors 424, and battery 426. Each of these components may be connected to each other (as needed for the functionality of MD 400) via a bus system 430. Exemplary automotive safety devices include a smartphone, such as an iPhone, a smart watch, or any other device that an individual may have on their person, including, smart eyeglasses, shoes, or other wearable devices. Processor 412 may execute instructions stored in memory 414. Camera 416 may capture both still and moving images. User input devices, include haptic devices, such as keyboards or buttons, and touch screens. Touch screen display 420 may be any type of display, such as LCD, LED, or other types of display. As an example, touch screen display 420 may be a capacitive touch screen. The touch screen (e.g., display 420) can detect touch events, such as tapping on the screen or swiping on the screen. Additional details regarding touch image data acquisition and processing are described in U.S. Pat. No. 6,323,846, which is incorporated by reference herein in its entirety.

Network interfaces may include communication interfaces, such as cellular radio, Bluetooth radio, UWB radio, or other types of wireless or wired communication interfaces. Sensors 424 may include a variety of sensors, such as accelerometers, gyroscopes, GPS, and proximity sensors. Battery 426 may be any portable battery, such as a chargeable lithium-ion battery. Although FIG. 4 shows a specific number of components arranged in a certain manner, MD 400 may include additional or fewer components arranged differently. In addition, MD 400 need not be a dedicated device for messaging; instead it could be a mobile phone, a smart watch, an augmented reality device (e.g., Google Glass) or any other wearable or portable device.

In one embodiment, MD 400 may further include a proximity detection module. In this example, proximity may serve as a proxy for a dynamically determined community. Proximity detection module may rely on LTE Direct (also known as 3GPP/3GPP2 ProSe proximity standard) to automatically determine which of the contacts have mobile devices that are in proximity to MD 400, and thus are in a state of proximity. In one embodiment, a state of proximity may refer to contacts whose cell phone devices are being served by the same cell site as MD 400. A state of proximity may also refer to whether MD 400 and the other user's (identified as contacts in a contact database associated with MD 400) devices are within the same city, town, or ZIP code area. As part of proximity detection, MD 400 may automatically perform location measurements to determine its location. MD 400 may automatically perform such measurements alone or in combination with servers in wireless networks 110. Either a control plane location solution, such as defined by 3GPP and 3GPP2 or a user plane location such as Secure User Plane Location (SUPL) defined by Open Mobile Alliance (OMA) may be used. Additional details concerning determining a state of proximity based on a control plane solution or a user plane solution are described in U.S. Patent Publication No. 2014/0162687, which is incorporated by reference herein in its entirety. In particular, FIGS. 7, 9, 414, 15, and 416 and related description provide additional details for determining the state of proximity. Other devices that are associated with the user's contacts may also automatically perform location measurements and report the measurements to proximity detection module using wireless networks 110. A state of proximity may refer to a current state of proximity or a predicted state of proximity. The current and/or predicted state of proximity may be determined using the techniques described in U.S. Patent Publication No. 2014/0162687, which is incorporated by reference herein in its entirety. As an example, FIGS. 7-13 of the '687 publication describe various protocols that could be used to assist in determining proximity between two devices.

In one embodiment, the message may be a pre-configured message that may be automatically transmitted via SMS, MMS, or similar services. In an alternative embodiment, prior to transmission, the pre-configured message may be modified to include additional information based on sensor measurements.

In one embodiment, the state of proximity is automatically determined in real-time. In other words, the state of proximity is derived dynamically in real-time. In one embodiment, proximity detection module may automatically determine a state of community. MD 400 may be one of the user elements (UEs), as this term is used in modern cellular networks. Thus, for example, MD 400 may be UE A and another mobile device may be UE B. User devices UE A and UE B each may have an instance of proximity detection module. These user devices may communicate with wireless networks 110 that may include service side functionality. Service side functionality may include multiple modules for supporting the detection of a state of community between UE A 402 and UE B 404. By way of example, service side functionality 420 may include a ProSe Function A, a ProSe Function B, a Community App Server, a SLP A, a SLP B, a MME, a HSS, and a S/P-GW. ProSe Function A may provide the network related actions required for proximity and community services to UE A. ProSe Function B may provide the network related actions required for proximity services to UE B. Separate ProSe functions, and their functionality could be combined. Each of these functions may provide proximity/community related services, including direct discovery and direct communications in case any of the user devices cannot be served by the cellular network E-UTRAN. Community App Server may be associated with providing services for determining a scope or the nature of a community, including a dynamically determined boundary for the community. Community App Server may handle application registration requests from user devices that have messaging modules that rely upon community-specific criteria based semantically-enabled messaging. SLP A may be one instance of Secure User Plane Location (SUPL) Location Platform (SLP). To request location updates for UE A, ProSe Function A may contact SLP A and to request location updates for UE B, ProSe Function B may contact SLP B. The UE's location may be reported intermittently to their respective ProSe Functions. Whenever respective ProSe Functions receive location updates for UE A and UE B, they may perform a proximity analysis to determine a state of community of UE A and UE B. Alternatively, ProSe Functions may perform a proximity/community analysis only when they receive a notification from a messaging device.

MME, which stands for Mobility Management Entity, may handle control plane management related to UE A and UE B. As an example, MME may provide indication to E-UTRAN that these user devices are authorized to use the proximity/community detection service, including the ProSe Functions. HSS, which stands for Home Subscriber Sever, is a database that contains user-related and subscriber-related information. MME may access HSS to obtain such information to determine whether the user devices that are requesting messaging and proximity/community detection are authorized to use such services. S/P-GW, which stands for Serving/PDN gateways, may handle the user plane, including handover. These functions could be combined or distributed in other manners, as well.

Figure 5:
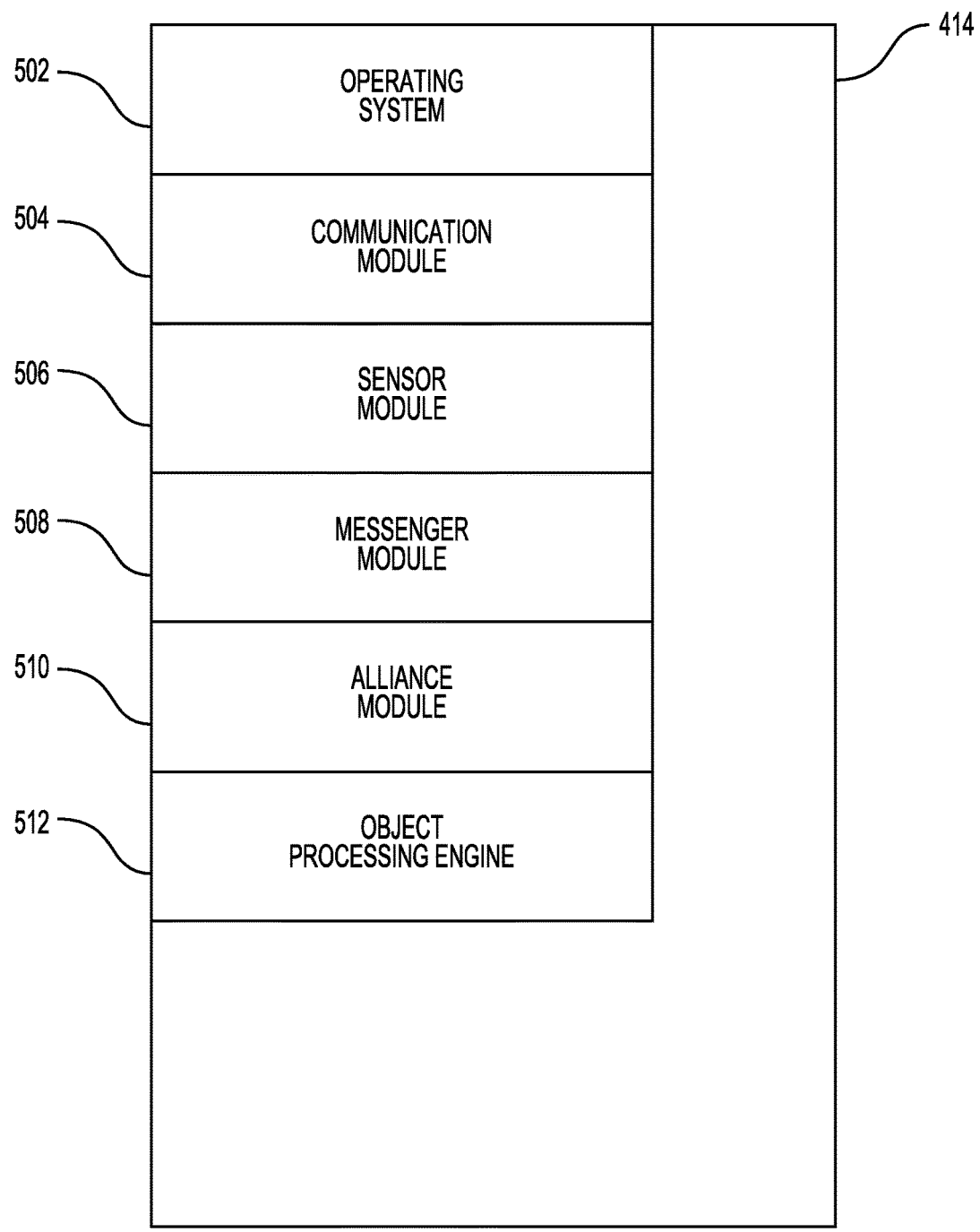
FIG. 5 is a diagram showing components of a messaging device of FIG. 4 in accordance with one example.

FIG. 5 is a diagram showing software components/modules of a messaging device 400 of FIG. 4 in accordance with one example. In one embodiment, these modules may be stored in memory 414 of MD 400 and may contain software instructions that when executed by processor 412 of MD 400 may provide the functionality associated with these modules. In one embodiment, some or all of these modules may be a part of a downloadable application from the Internet, as an example from Apple's iTunes store or Google's Google Play store. Exemplary modules stored in memory may include operating system 502, a communication module 504, a sensor module 506, a messenger module 508, an alliance module 510, and an object processing engine 512. The functionality associated with the modules may also be distributed or aggregated. Each one of these modules may provide at least some of the functionality discussed with respect to the flow chart shown in FIG. 6 and other functionality related to this disclosure.

Figure 6:
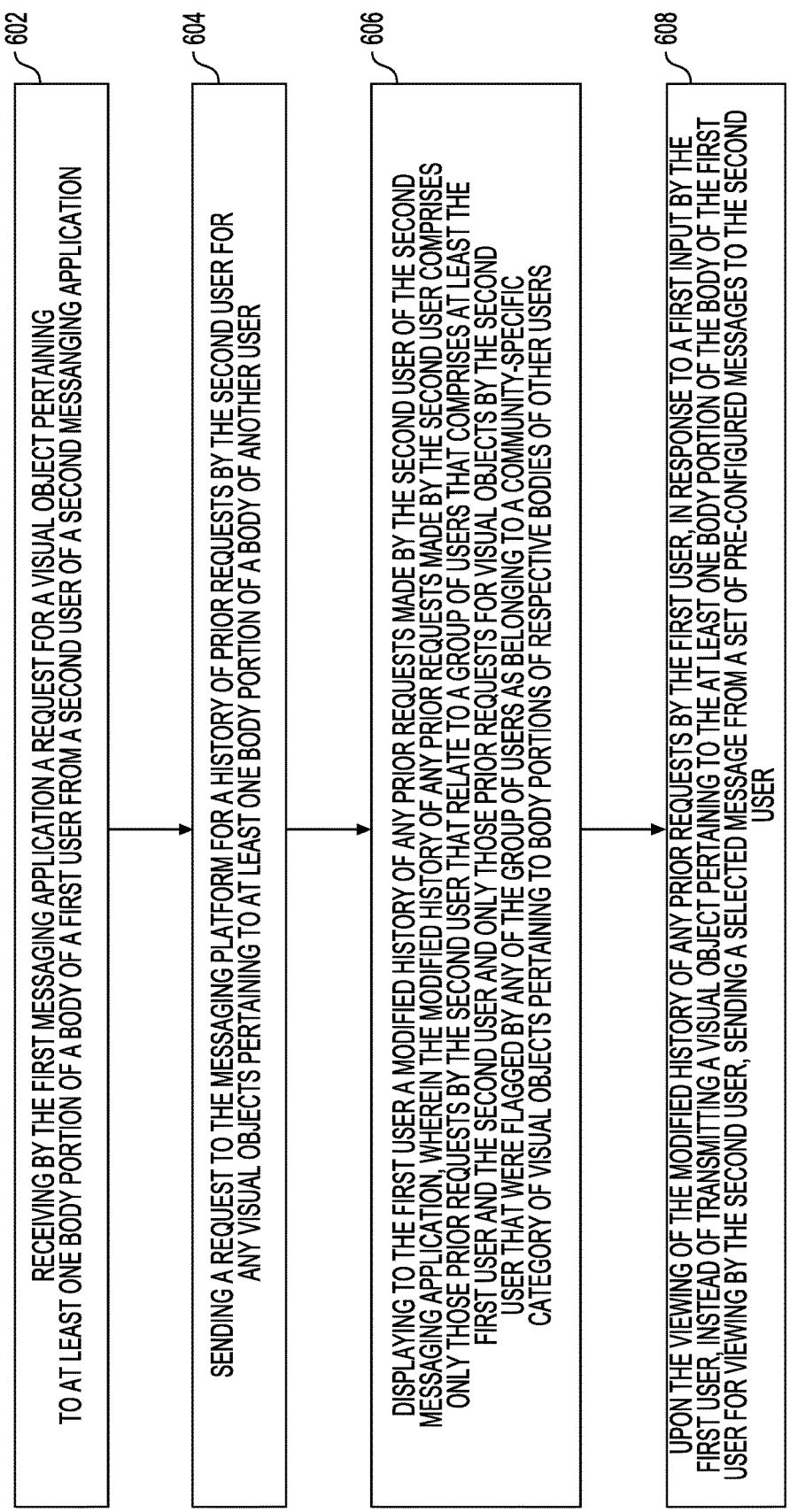
FIG. 6 is a flow chart showing at least some of the steps for a method in a semantically-enabled controlled sharing of objects in a distributed messaging platform.

FIG. 6 is a flow chart 600 showing at least some of the steps for a method in a semantically-enabled controlled sharing of objects in a distributed messaging platform.

In step 602, a user of a first messaging application, accessible via MD 400 may receive a request for a visual object pertaining to at least one body portion of a body of the first user from a second user of a second messaging application.

In step 604, in response to the request from the second user of the second messaging application, via the first messaging application, MD 400 may in response to the input from the first user, send a request to the messaging platform for a history of prior requests by the second user for any visual objects pertaining to at least one body portion of a body of another user.

In step 606, MD 400 may display to the first user a modified history of any prior requests made by the second user of the second messaging application, where the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users. The group of users is based on at least one of: (1) students that attend a common high school, (2) students that attend a particular grade as part of the common high school, or (3) students that attend a common college or another higher education institution. This step may include the messaging platform interacting with the control platform of FIG. 1 to help provide this modified history. As part of this process, control platform may apply semantically-enabled control to the data and models stored as part of the platform. As an example, the selection of the prior requests may include an ontological analysis of requests based on an ontology that may be community-specific in terms of both the content and the model. Similarly, control platform may use semantic natural language processing models and algorithms to generate the modified history. As an example, not all request from the other user may be worded in a way that the messaging platform may determine that the request should be included as part of the history. Instead, by applying Bayesian or other plausible inferenced based semantic-analysis, control platform may generate a more accurate and comprehensive list of the requests. This processing may not only be limited to the text of the requests—for example, send me a nude picture, a naked picture, a birthday suit picture, and the like—but also may include processing based on artificial intelligence of the images sent as part of the response to such a request. That analysis may include classification of visual objects, via object classification and analysis. Image search and classification algorithms may be used for this purpose. In addition, the scope and size of the community may be statically determined—such as a high school—or it may be dynamically established based on the geographic reach or size of the community, which may be specified and refined based on cellular networks ability to establish geo-fences or proximity/community.

As an example, a proximity detection module may work in conjunction with the service side functionality to automatically determine the community to which the two users may belong. As an example, upon the receipt of the request for an object, e.g., an image of a body portion, the messaging device may automatically request proximity detection module to determine whether the requestor is part of the community and if so which community. Upon receiving such a request, proximity detection module may automatically contact via wireless networks 110 ProSe Function. ProSe Function A may in turn work with Community App Server 426, which in turn may work with ProSe Function B and other modules on the service side, such as SLP A, SLP B, MME, HSS, and S/P-GW to determine the scope of community.

In step 606, upon the viewing of the modified history of any prior requests by the first user, in response to a first input by the first user, messaging device 4000 may send a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

Upon the viewing of the modified history of any prior requests by the first user, in response to a second input from the first user, MD 400 may send a selected message from a set of pre-configured messages, via the first messaging application, to the messaging platform for transmission of the selected message to the second user. In one embodiment, the message may be a pre-configured message that may be transmitted via Short Message Service (SMS), Multimedia Messaging Service (MMS), or similar services. In an alternative embodiment, prior to transmission, the pre-configured message may be automatically modified to include additional information based on sensor measurements. As an example, MD 400 may determine its location by interacting with a location server in wireless networks 110.

In response to the second input from the first user, MD 400 may send a request, via the first messaging application, to the messaging platform to not serve the requested visual object pertaining to the at least one body portion of the body of the first user to the second user.

In response to the second input from the first user, MD 400 may send a request, via the first messaging application, to the messaging platform to flag the request from the second user as belonging to the community-specific category of requests for visual objects pertaining to body portions of other users.

In response to the second input from the first user, MD 400 may prompt the first user to attach a screenshot of the request from the second user to the selected message. The screenshot may later be processed by the control platform to further refine the history of the requests made by the second user that fit the criteria specific to the community at issue. This may further involve image classification applying Bayesian models or other AI models to make inferences based on incomplete information.

It is to be understood that the modules and components depicted herein are merely exemplary. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. In addition, the phrases "at least one," "one or more," and "and/or" are open-ended expressions. For example, each of the expressions "at least one of A, B, and C," "at least one of A, B, or C," "one or more of A, B, and C," and "one or more of A, B, or C" means A alone, B alone, C alone, A and B together, A and C together, B and C together, or A, B, and C together.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method, in a device including a first messaging application configured to communicate with a messaging platform including a messaging server: (1) configured to receive requests for visual objects from the messaging application and (2) configured to serve requested visual objects to the messaging application, comprising:

receiving by the first messaging application a request for a visual object pertaining to at least one body portion of a body of the first user from a second user of a second messaging application;

in response to the request from the second user of the second messaging application, via the first messaging application, sending a request to the messaging platform for a history of prior requests by the second user for any visual objects pertaining to at least one body portion of a body of another user;

displaying to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users; and upon the viewing of the modified history of any prior requests by the first user, in response to a first input from the first user, instead of transmitting a visual object pertaining to the at least one body portion of the body of the first user for viewing by the second user, sending a selected message from a set of pre-configured messages, via the first messaging application, to the messaging platform for transmission of the selected message to the second user.

1. The method of claim 1 further comprising in response to a second input by the first user, sending a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

The invention claimed is:

1. A method in a device including a first messaging application configured to communicate with a messaging platform: (1) configured to receive requests for visual objects from the messaging application and (2) configured to serve requested visual objects to the messaging application, the method comprising:

receiving by the first messaging application a request for a visual object pertaining to at least one body portion of a body of the first user from a second user of a second messaging application;

in response to the request from the second user of the second messaging application, via the first messaging application, sending a request to the messaging platform for a history of prior requests by the second user for any visual objects pertaining to at least one body portion of a body of another user;

displaying to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users, wherein at least a size of the group of users is determined dynamically by a proximity detection module associated with the device; and upon the viewing of the modified history of any prior requests by the first user, in response to a first input from the first user, instead of transmitting a visual object pertaining to the at least one body portion of the body of the first user for viewing by the second user, sending a selected message from a set of pre-configured messages, via the first messaging application, to the messaging platform for transmission of the selected message to the second user and, in response to the first input from the first user, sending a request, via the first messaging application, to the messaging platform to flag the request from the second user as belonging to the community-specific category of requests for visual objects pertaining to body portions of other users.

2. The method of claim 1 further comprising in response to a second input by the first user, sending a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

3. The method of claim 1 further comprising, in response to the first input from the first user, sending a request, via the first messaging application, to the messaging platform to not serve the requested visual object pertaining to the at least one body portion of the body of the first user to the second user.

4. The method of claim 1 further comprising, in response to the first input from the first user, prompting the first user to attach a screenshot of the request from the second user to the selected message.

5. The method of claim 1 further comprising the first messaging application providing a search box allowing the first user to search for any users whose at least one request for a visual object pertaining to a body portion of a body of another user has been flagged as part of the community-specific category of requests for visual objects pertaining to body portions of other users.

6. The method of claim 5 further comprising the first messaging application providing a search box allowing the first user to search for any users who have flagged at least one request for a visual object pertaining to a body portion of a body of another as part of the community-specific category of requests for visual objects pertaining to body portions of other users.

7. The method of claim 1, wherein the group of users is based on at least one of: (1) students that attend a common high school, (2) students that attend a particular grade as part of the common high school, or (3) students that attend a common college or another higher education institution.

8. A non-transitory computer-readable medium comprising instructions corresponding to a method in a device including instructions corresponding to a first messaging application configured to communicate with a messaging platform: (1) configured to receive requests for visual objects from the messaging application and (2) configured to serve requested visual objects to the messaging application, the method comprising:
   receiving by the first messaging application a request for a visual object pertaining to at least one body portion of a body of the first user from a second user of a second messaging application;
   in response to the request from the second user of the second messaging application, via the first messaging application, sending a request to the messaging platform for a history of prior requests by the second user for any visual objects pertaining to at least one body portion of a body of another user;
   displaying to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users, wherein at least a size of the group of users is determined dynamically by a proximity detection module associated with the device; and
   upon the viewing of the modified history of any prior requests by the first user, in response to a first input from the first user, instead of transmitting a visual object pertaining to the at least one body portion of the body of the first user for viewing by the second user, sending a selected message from a set of pre-configured messages, via the first messaging application, to the messaging platform for transmission of the selected message to the second user, and in response to the first input from the first user, sending a request, via the first messaging application, to the messaging platform to flag the request from the second user as belonging to the community-specific category of requests for visual objects pertaining to body portions of other users.

9. The non-transitory computer-readable medium of claim 8 further comprising instructions for: in response to a second input by the first user, sending a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time.

10. The non-transitory computer-readable medium of claim 8 further comprising instructions for: in response to the first input from the first user, sending a request, via the first messaging application, to the messaging platform to not serve the requested visual object pertaining to the at least one body portion of the body of the first user to the second user.

11. The non-transitory computer-readable medium of claim 8 further comprising instructions for: in response to the first input from the first user, prompting the first user to attach a screenshot of the request from the second user to the selected message.

12. The non-transitory computer-readable medium of claim 8 further comprising instructions for: the first messaging application providing a search box for allowing the first user to search for any users whose at least one request for a visual object pertaining to a body portion of a body of another user has been flagged as part of the community-specific category of requests for visual objects pertaining to body portions of other users.

13. The non-transitory computer-readable medium of claim 8, wherein the first messaging application providing a search box allowing the first user to search for any users who have flagged at least one request for a visual object pertaining to a body portion of a body of another as part of the community-specific category of requests for visual objects pertaining to body portions of other users.

14. The non-transitory computer-readable medium of claim 8, wherein the group of users is based on at least one of: (1) students that attend a common high school, (2) students that attend a particular grade as part of the common high school, or (3) students that attend a common college or another higher education institution.

15. A non-transitory computer-readable medium comprising instructions for enabling a first device having a first messaging application configured to communicate with a messaging platform: (1) configured to receive requests for visual objects from messaging applications and (2) configured to serve requested visual objects to the messaging applications, the instructions configured:
  to receive a request from a second messaging application for a visual object relating to a first user of the first messaging application from a second user of a second messaging application;
  to, in response to the request from the second user of the second messaging application, via the first messaging application, send a request to the messaging platform for a history of prior requests by the second user for any visual objects pertaining to at least one body portion of a body of another user;
  to display to the first user a modified history of any prior requests made by the second user of the second messaging application, wherein the modified history of any prior requests made by the second user comprises only those prior requests by the second user that relate to a group of users that comprises at least the first user and the second user and only those prior requests for visual objects by the second user that were flagged by any of the group of users as belonging to a community-specific category of requests for visual objects pertaining to body portions of respective bodies of other users, wherein at least a size of the group of users is determined dynamically by a proximity detection module associated with the device; and
  to, upon the viewing of the modified history of any prior requests by the first user, in response to a first input by the first user, sending a request, via the first messaging application, to the messaging platform to transmit a visual object pertaining to the at least one body portion of the body of the first user for viewing by the second user, wherein the messaging platform is configured to: (a) serve the visual object pertaining to the at least one body portion of the body of the first user to the second messaging application, and (b) schedule an automatic deletion of the visual object pertaining to the at least one body portion of the body of the first user after a specified viewing period, a specified number of views, or a specified period of time, and in response to a second input by the first user send a request, via the first messaging application, to the messaging platform to flag the request from the second user as belonging to the community-specific category of requests for visual objects pertaining to body portions of other users.

16. The non-transitory computer-readable medium of claim 15 further comprising instructions configured to, upon the viewing of the modified history of any prior requests by the first user, in response to the second input from the first user, instead of transmitting the visual object pertaining to the at least one body portion of the body of the first user for viewing by the second user, send a selected message from a set of pre-configured messages, via the first messaging application, to the messaging platform for transmission of the selected message to the second user.

17. The non-transitory computer-readable medium of claim 15 further comprising instructions configured to, in response to the second input from the first user, prompt the first user to attach a screenshot of the request from the second user to the selected message.

\* \* \* \* \*